United States Patent Office 3,409,272
Patented Nov. 5, 1968

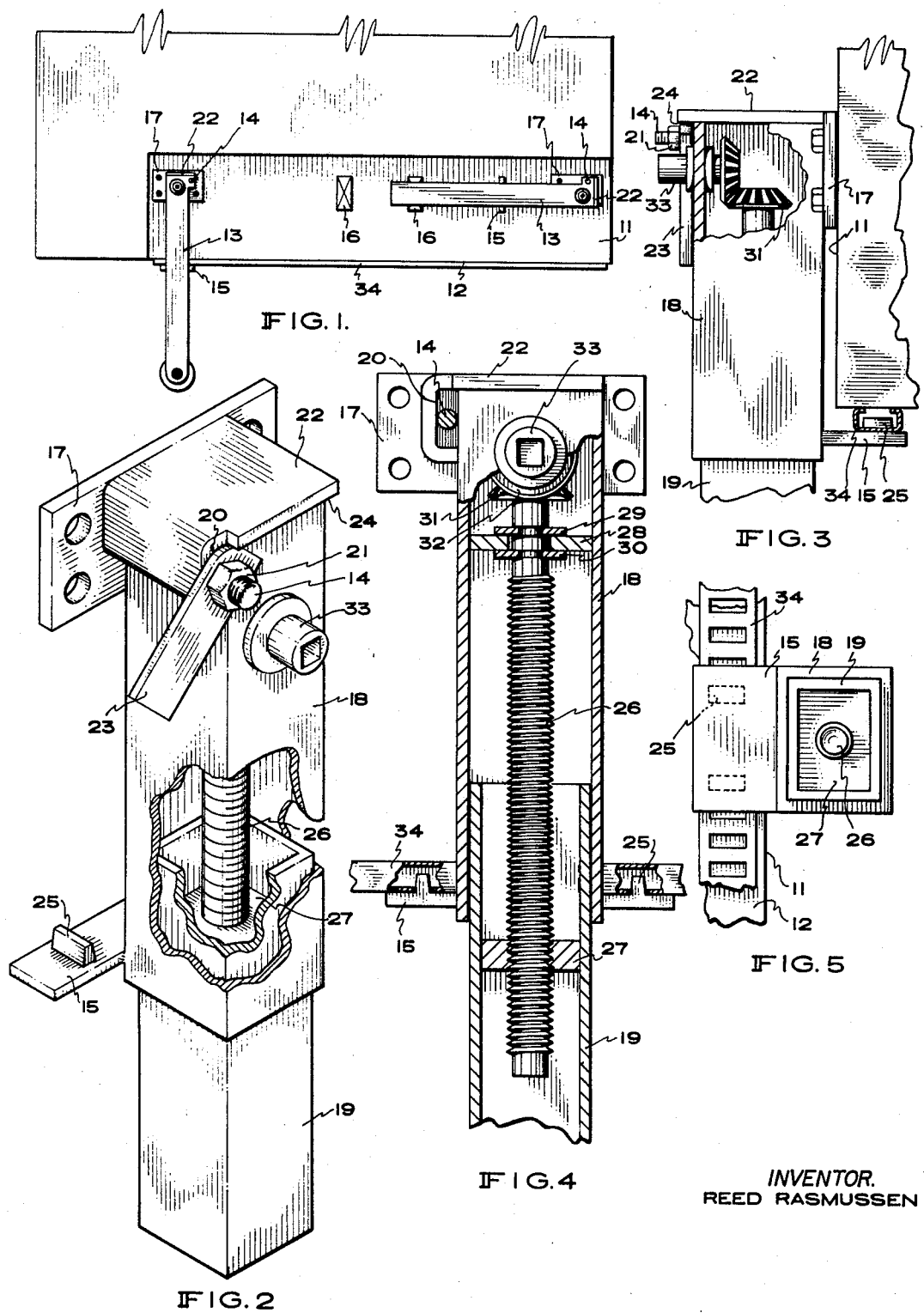

3,409,272
CAMPER SUPPORT INCLUDING LIFT MEANS
Reed Rasmussen, 168 W. Gentile,
Layton, Utah 84041
Filed Feb. 13, 1967, Ser. No. 615,717
8 Claims. (Cl. 254—45)

ABSTRACT OF THE DISCLOSURE

A camper leg having top and bottom ends, with an elongated mounting slot at the top end for pivotally mounting the leg on a shaft secured to the side wall of a camper, and a bottom support plate attached to the leg between its ends for supporting the bottom of the camper. A cam can be secured to the shaft which coacts with a cam follower to shift the position of the shaft in the slot and urge the bottom support against a rack on the bottom of the camper.

---

This invention relates to an improved support, and in particular to an improved support for a transportable object such as a camper, which can be easily repositioned from a nonsupport position to a support position, or alternatively, from a support to a nonsupport position.

During recent years, transportable objects, such as coaches and campers, constructed for removable placement upon the bed of a traction vehicle have become very popular. Various supports have been devised for supporting the object when it is not positioned on the bed of the vehicle and are particularly useful in combination with a device such as described in my U.S. Patent No. 3,229,839 for loading and unloading a camper from a truck bed. Such supports must maintain the camper in an elevated position when it is not on the vehicle bed and yet must be easily removable or repositioned to a location which is away from the bottom of the camper so that it can be placed on the vehicle bed. Heretofore supports used for this purpose have not proven to be entirely satisfactory. They are generally bolted to the sides of the camper with attachment means and such means add an undesirable extra width to the camper body. In addition, the bolts securing the supports to the camper must generally be removed or replaced each time the support is relocated. Also, the supports are often bolted to the camper's side walls and since the side walls are generally constructed from a thin walled material, they are often damaged by the attached supports.

It is accordingly a principal object of this invention to provide a camper support which avoids the aforementioned objections and disadvantages of camper supports heretofore used.

A further object of this invention is to provide a camper support which is easily repositioned from a support position to a nonsupport position, and, alternatively, from a nonsupport to a support position.

A further object is to provide a camper support which is attached to the camper in a manner which will not damage the camper or add extra width to the camper.

Still further objects of this invention will become apparent to those skilled in the art as the invention is better understood by reference to the detailed description appearing hereinafter.

According to my invention, the foregoing objects and attendant advantages may be achieved by providing a camper support comprising elongated leg means pivotally connected at one end to the side wall of a camper and provided with a camper bottom support plate which is secured to the midportion of the leg to coact with the bottom of the camper and support the camper at an elevated position above the ground. To pivotally connect the leg to the camper, a slot is provided in the leg, proximate said one end, which is elongated in the direction of the longitudinal axis of the leg and a mounting shaft, secured to a side wall of the camper, is passed therethrough. The camper bottom support plate extends outwardly from the support leg to coact with the bottom of the camper and thereby support substantially the entire weight of the camper. In the preferred embodiment of this invention, a cam is rotatably mounted on the mounting shaft and a cam follower is attached to said leg in a coacting position with the cam to thereby shift the shaft in the elongated slot when the cam is rotated. In this fashion, the bottom support plate is moved into or out of contact with the bottom of the camper.

So that the invention can be more readily understood and carried into effect, reference is made to the accompanying drawings which are offered by way of example only and are not to be taken as limiting the invention, the scope of which is defined by the appended claims, which obviously embrace equivalent structures.

FIGURE 1 is a side elevation view of the lower portion of a camper with a support of this invention shown in a support position and in a nonsupport position.

FIGURE 2 is a perspective view of the support of this invention.

FIGURE 3 is a side view of the support showing the top plate of the support and its relation to the cam.

FIGURE 4 is a plan elevation view of the support with its front face shown partially broken away for clarity.

FIGURE 5 is a bottom view of the support showing the camper bottom support plate and its relationship with the bottom of the camper.

Referring now more particularly to the drawings, in FIGURE 1 there is shown camper 10 with side wall 11 and bottom 12. Support 13 is rotatably mounted on shaft 14 which is attached to camper side 11. The support mounted proximate the back end of camper 10 is shown in its supporting position so that bottom support plate 15 contacts and supports camper bottom 12. The support attached to the front end of camper 10 is shown in a horizontal position used when the camper is mounted on the bed of a traction vehicle. Tie means 16 are used to maintain the support in a horizontal position.

Support 13 is rotatably attached to shaft or bolt 14 by passing said shaft through mounting slot 20 provided in support 13 proximate its top end. Said shaft 14 is secured at one end to plate 17, which plate is in turn bolted or otherwise connected to camper sidewall 11. Support 13 can be divided into a plurality of sections, e.g., upper section 18 and lower section 19, and when this is the case, mounting slot 20 is provided in said upper section 18 proximate its top end. The mounting slot is elongated in a direction along the approximate elongated axis of support 13, i.e., the longitudinal axis of the support. Nut 21 can be connected to the end of shaft 14 which in turn secures support to said shaft 14. Bottom support plate 15 is attached to support 13, e.g., to upper section 18, at a positon which allows camper bottom 12 to be supported thereon while shaft 14 is positioned away from the bottom of elongated slot 20. In this fashion, the entire weight of camper 10 is placed on bottom support 15 rather than on shaft 14. Preferably top plate 22 is welded or otherwise attached to the top end of support 13 and is bent into contact with one side of said support to form elongated slot 20.

Cam 23 is rotatably mounted on shaft 14 and is designed to coact with cam follower 24 attached to support 13. Preferably, said cam follower 24 is constructed by extending upper plate 22 outwardly past the face of support 13 as shown in FIGURE 3. When cam 23 is rotated, it coacts with cam follower 24 to shift shaft 14 in slot 20 which in turn causes support 13 to be moved in a direction substantially parallel with its longitudinal axis. In this fashion, support 13 can be shifted to bring bottom support plate 15 into contact with the camper bottom 12 (camper support position), or said support can be shifted to move said bottom support plate 15 away from camper bottom 12 so that the support can be rotated to its horizotal position (camper transportable position). Elongated slot 20 also allows support 13 to be pulled outwardly away from camper sidewall 11, and this is required when support 13 is rotated on shaft 14 since bottom support 15 extends inwardly beneath camper bottom 12.

The support of my invention is particularly adapted to be used in connection with campers fitted with rack means 34 along the side edges of their bottom 12 as shown in FIGURE 5. Generally, such racks are used in combination with loading devices. When camper 10 is fitted with rack means 34, pins 25, adapted to coact with the slots in said rack means are attached to bottom support 15 thereby providing means to securely attach the bottom plate to the camper bottom, i.e., to prevent the support from being pulled outwardly away from the camper sidewall.

Support 13 can be divided into a plurality of sections, e.g., upper section 18 and lower section 19, as heretofore indicated, which are slidably mounted within each other to provide means for modifying the length of the support. Plate 27 is attached to the inside of lower section 19 and is adapted to coact with screw 26, i.e., plate 27 is provided with a female thread which allows screw 26 to be turned therein. Said screw 26 is in turn journaled to bracket 28 mounted in upper section 18. Flanges 29 and 30 are attached to screw 26 on opposite sides of said bracket 28 to hold said screw in a fixed position within the bracket. Beveled gear 31 is attached to the upper end of screw 26 and coacts with beveled drive gear 32 which is rotatably mounted in upper section 18. Said drive gear 32 is connected to adapter 33 which is designed to coact with conventional cranking means such as a hand crank. When gear 32 is rotated, it rotates gear 31 which in turn turns screw 26 to raise or lower section 19 with respect to section 18.

In using the support of my invention in combination with a transportable object, such as a camper, the assembled support, including mounting plate 17 is placed against side wall 11 of camper 10 so that bottom plate 14 contacts camper bottom 12 and teeth 25 are aligned with holes in rack 34. Cam 23 is then rotated so that shaft 14 is positioned at the proximate bottom portion of slot 20. Attaching plate 17 is then securely fastened to camper side wall 11 in the fashion previously indicated. By securing support 13 to the camper in this fashion the entire weight of said camper rests on bottom plate 15 rather than on shaft 14. Support 13 cannot be pulled outwardly away from side wall 11 when it is in a supporting position since teeth 25 coact with the holes in rack 34. When it is desired to relocate support 13 to a horizontal position so that camper 10 can be loaded onto the bed of a traction vehicle, cam 23 is rotated so that shaft 14 is positioned proximate the upper portion of slot 20 and bottom plate 15 is repositioned away from camper bottom 12, thereby enabling the support to be pulled outwardly away from camper side wall 11 and rotated to a horizontal position. Since slot 20 is elongated, leg 13 can be pulled outwardly away from camper side wall 11 without placing a strain on said side wall and shaft 14.

The term "rack" as used in the description and in the claims includes not only conventional tooth gear racks but also perforated straps. The term "cam" refers to any device for converting regular rotary motion to irregular rotary or reciprocating motion.

Whereas there is here illustrated and specifically described a certain preferred construction which is presently regarded as the best mode of carrying out the invention, it should be understood that various changes may be made and other construction adopted without departing from the inventive subject matter particularly pointed out and claimed.

I claim:
1. In combination with a transportable object having sidewalls and a bottom, a support for said object comprising an elongated leg having a bottom and a top end; outwardly extending bottom support means secured to the midportion of said leg for supporting the bottom of said transportable object; and connecting means secured to said leg proximate said top end for rotatably securing said leg to said sidewall of said transportable object and for moving said outwardly extending bottom support means to a support position beneath the bottom of the transportable object to support substantially all of the weight of said object on said bottom support means.

2. The combination of claim 1 wherein rack means are positioned along the opposite edges of said bottom of said transportable object which coact with teeth in said bottom support means to lock said leg to said object.

3. The combination of claim 1 wherein cam means are rotatably mounted on said mounting shaft and cam follower means are attached to said leg and positioned to coact with said cam means wherein the position of said mounting shaft is shifted in said elongated slot when said cam is rotated.

4. The combination of claim 3 wherein a top plate is attached to the top end of said leg which plate is shaped to form said elongated slot.

5. The combination of claim 4 wherein said top plate has an outwardly extending top face adapted to coact with said cam as a cam follower.

6. The combination of claim 5 wherein said leg is a sectional leg with said sections being joined together with expansion means for varying the length of said leg.

7. The combination of claim 6 wherein rack means are positioned along the opposite edges of said bottom of said transportable object which coact with teeth in said bottom support means to lock said leg to said object.

8. The combination of claim 1 wherein said connecting means comprises a mounting slot positioned in said leg proximate said top end which slot is elongated between said top end and said bottom end of said leg and mounting shaft means fixedly attached to the sidewall of said transportable object which shaft is rotatably mounted within said elongated slot.

References Cited

UNITED STATES PATENTS

| | | | |
|---|---|---|---|
| 3,148,795 | 9/1964 | Leach | 254—45 X |
| 3,243,193 | 3/1966 | Fulmer et al. | 254—45 X |
| 3,322,392 | 5/1967 | Hoffman | 254—47 |
| 1,303,854 | 5/1919 | Clark | 254—45 |
| 2,734,726 | 2/1956 | Gebhart | 254—86 |
| 3,093,362 | 6/1963 | Schaefer | 254—86 |
| 3,315,942 | 4/1967 | Buberniak | 254—45 |

MILTON S. MEHR, *Primary Examiner.*